United States Patent [19]
Collins et al.

[11] Patent Number: 5,149,959
[45] Date of Patent: Sep. 22, 1992

[54] AIRBORNE MULTIBAND IMAGING SPECTROMETER

[75] Inventors: William E. Collins; Sheng-Huei Chang, both of Millbrook; Mark J. Westfield, Hopewell Junction, all of N.Y.

[73] Assignee: Geophysical & Environmental Research Corporation, N.Y.

[21] Appl. No.: 685,614

[22] Filed: Apr. 15, 1991

[51] Int. Cl.$^5$ ............................................. G01J 3/50
[52] U.S. Cl. .................................. 250/226; 250/339; 356/328
[58] Field of Search .............. 250/226, 235, 236, 253, 250/332, 334, 339, 370.08; 356/51, 305, 326, 328; 358/113

[56] References Cited

U.S. PATENT DOCUMENTS

| | | | |
|---|---|---|---|
| 4,134,683 | 1/1979 | Goetz et al. | 356/407 |
| 4,650,997 | 3/1987 | Yawn et al. | 250/334 |
| 5,088,823 | 2/1992 | Smith, Jr. et al. | 356/328 |

OTHER PUBLICATIONS

"Imaging Spectrometry for Earth Remote Sensing", Goetz et al. *Science*, Jun. 1985 vol. 228, No. 4704.
"Imaging Spectroscopy II" Vane et al. Proceedings of SPIE-The International Society for Optical Engineering, Aug. 1987 vol. 834.
"Recent Advances in Sensors, Radiometry, and Data Processing for Remote Sensing", Vane et al. Proceedings of SPIE-The International Society for Optical Engineering, Apr. 1988, vol. 924.
"Airborne Visible Infrared Imaging Spectrometer (AVIRIS)", G. Vane, *NASA JPL publication* 87-38, Nov. 1987.
"The Geophysical Environmental Research Corp. 63 Channel Airborne Imaging Spectrometer and 12 Band Thermal Scanner", SPIE vol. 1298 Imaging Spectroscopy of the Terrestrial Environment, Collins et al., 1990.
"Iron Mineral Reflectance in Geophysical and Environmental Research Spectrometer (GERIS) Data", D. L. Taranik et al., Seventh Thematic Conference on Remote Sensing for Exploration Geology, Oct. 1989.
"Mineral Mapping at Cuprite, Nevada with a 63 Channel Imaging Spectrometer", Kruse et al., *Photometric Engineering and Remote Sensing*, vol. 56, No. 1, Jan. 1990 pp. 83-92.

*Primary Examiner*—David C. Nelms
*Assistant Examiner*—K. Shami
*Attorney, Agent, or Firm*—Arnold L. Albin

[57] ABSTRACT

A multichannel imaging spectrometer for low speed, low altitude airborne geological, geophysical and environmental surveys, particularly adapted to provide detector limited noise threshold. An optical scanner employs a rotating polygon allowing reduced scan optics with increased data acquisition efficiency. Scan speeds from 5 to 50 scan/sec with up to 2048 pixels per scan are available. Multiple spectrometers integrally registered allow channelization of the received signal to optimize noise performance in the range from ultraviolet through infrared. Output data is in a form for recording and real time display. All channels are acquired simultaneously resulting in perfect band-to-band registration with continuous spectral curves for each pixel.

17 Claims, 6 Drawing Sheets

AIRBORNE MULTIBAND IMAGING SPECTROMETER

BACKGROUND OF THE INVENTION

1. Field of the Invention

The invention relates generally to spectrometers, and more particularly to an apparatus for narrowband radiometry and for real time detection, recording, and display of mineralogic spectra in the form of radiated and reflected emissions for airborne geological investigations.

2. Description of the Prior Art

An airborne system for geographical surveys of the earth's surface using a high spectral resolution remote sensing instrument is described by G. Vane, et al in "Airborne Visible/Infrared Imaging Spectrometer (AVIRIS)," JPL Pub. 87-38, Nov. 15, 1987, which is hereby incorporated by reference. The AVIRIS is a 224-channel instrument utilizing the spectral range of 0.4 um to 2.45 um in contiguous spectral bands approximately 10 nm wide. Individual spectra of several minerals were successfully extracted from the AVIRIS data. The AVIRIS instrument, however, was designed for a high altitude, high speed aircraft and is unsuitable to low speed, low altitude aircraft for commercial exploration. Further, while possessing high resolution, only a limited spectral range was covered. Temperature and vibration limitations necessitated utilizing fiberoptic coupling between the foreoptics and the spectrometers, requiring complex active temperature compensation for focusing the fiberoptics. While individual channels were capable of high resolution, the outputs of each detector element were multiplexed for each spectrometer, so that continuous data from each detector element is not available. Further, the dynamic range of the system was limited by a ten-bit analog-to-digital converter.

An improved imaging spectrometer was described by W. E. Collins and S-H. Chang in "The Geophysical Environmental Research Corp. 63 Channel Airborne Imaging Spectrometer And 12 Band Thermal Scanner", SPIE Vol. 1298, pp. 62–71, Apr. 16–17, 1990. The GER imaging spectrometer covers 0.4–2.5 um in 63 channels of varying bandwidth. Both visible light and thermal detection is provided. Scanning optics utilize a rotating polygon mirror which scans the ground four times per revolution, allowing a factor of four reduction of rotation speed to scan speed. The spectrometer design provides for permanent registration between channels without adjustment. All 63 detectors have parallel preamplifiers and analog-to-digital converters. No switching or multiplexing of the detector outputs is used. A 12 bit or greater analog to digital converter permits a system providing high dynamic range with no on-board gain adjustment required. Multiple data channels may be displayed in real time during flight and recorded for later data reduction.

The present invention is an improved model of the GER 63 channel scanner with the capability for up to 640 channels over a range of 0.35 um through 20 um.

SUMMARY OF THE INVENTION

The present invention provides an imaging spectrometer particularly adapted for low altitude low speed airborne applications to geophysical, geological and environmental surveys. It provides a continuous digital readout from each detector channel. In a preferred embodiment it comprises an optical image assembly including a wide angle rotating mirror having a plurality of reflective surfaces for providing a substantially continuous image with respect to time of radiant spectral emissions in a predetermined angular field of view. A first fixed mirror redirects the image of spectral emissions from the rotating mirror through an aperture to a collimating lens and though a further mirror to a spectrometer. The spectrometer comprises a beam splitter, located in the output of the optical path of the collimating lens, which divides the spectral emissions into two contiguous bands having different predetermined wave lengths. A second fixed mirror is used to direct each of the first and second bands of spectral emissions to their respective diffraction gratings. The diffraction gratings act selectively to respond to the spectral emissions impinging thereon and provide a predetermined angular dispersion of the spectral emissions at different predetermined wave-lengths. The number and bandwidth of these dispersed emissions have been selected to maximize the detection threshold.

The detectors are comprised of a plurality of photoresponsive sensing elements configured in a line array for each diffraction grating. The detectors may employ photovoltaic or photoconductive detection, depending on the desired spectral response and noise characteristics. Each of the sensing elements is designed to respond to a given bandwidth of spectral emissions and is spatially disposed for alignment with one of the angularly disposed spectral emissions; the sensing elements may be incrementally spaced in proportion to a given wavelength to which each of the elements are responsive, depending on the embodiment. Thus, each detector provides a signal representative of a given spectral emission amplitude as a function of wavelength. The diffraction gratings and corresponding detectors cooperate in alignment to maintain registration of the angularly disposed spectral emissions with predetermined ones of the detector sensing elements, without the need for inflight adjustment.

The detector outputs are directed to a signal processor, which includes a sample-and-hold circuit for holding a detected signal at a substantially constant value for a predetermined period of time corresponding to the time to scan a pixel, followed by an analog-to-digital converter. Each detector element is processed in parallel, thereby to provide a continuous signal output in digital form at each of the sensed spectral frequencies. The detected signal output is periodically sampled in synchronism with rotation of the rotating mirror and thereby provides an updated pixel-by pixel sample as each of the reflective surfaces traverses an angular field of view.

DESCRIPTION OF THE PREFERRED EMBODIMENTS

Figure 1:
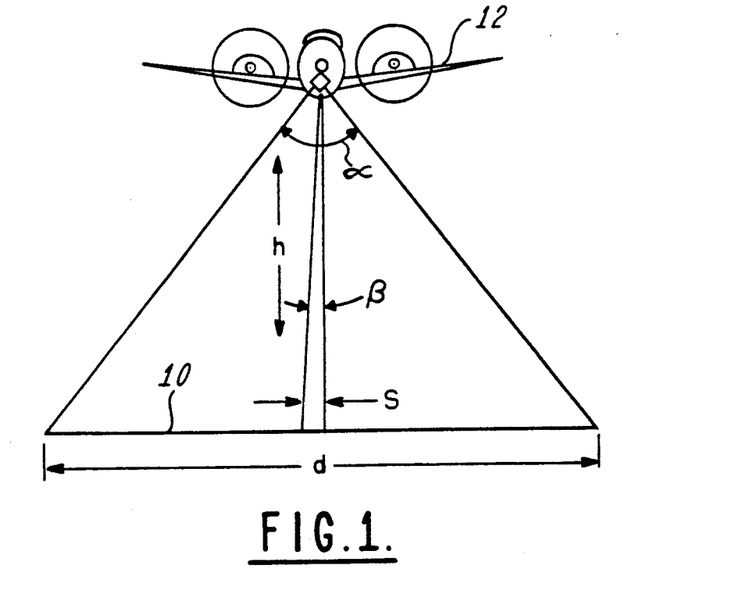
FIG. 1 is a view showing scan angle and field of view of an airborne scanning apparatus.

Referring now to FIG. 1 of the drawings, there is shown a view of the scan angle and field of view of an airborne imaging apparatus of the present invention. Radiant energy at various wavelengths is reflected from terrain 10 and is received by an imaging system located in aircraft 12. Typically, in an aircraft flying at 110 mph at an altitude of h of 20,000 ft and a scan angle of 90 degrees the field of view d is approximately 40,000 ft or 7.6 mi. With an aperture size of 0.5 mm a picture element (pixel) defined by the instantaneous field of view (IFOV) $\beta = 3.3$ mRAD will yield a ground spot size $S = 20$ m $\times 20$ m square. Other aperture sizes will yield correspondingly proportional IFOV and ground spot sizes.

Figure 2:
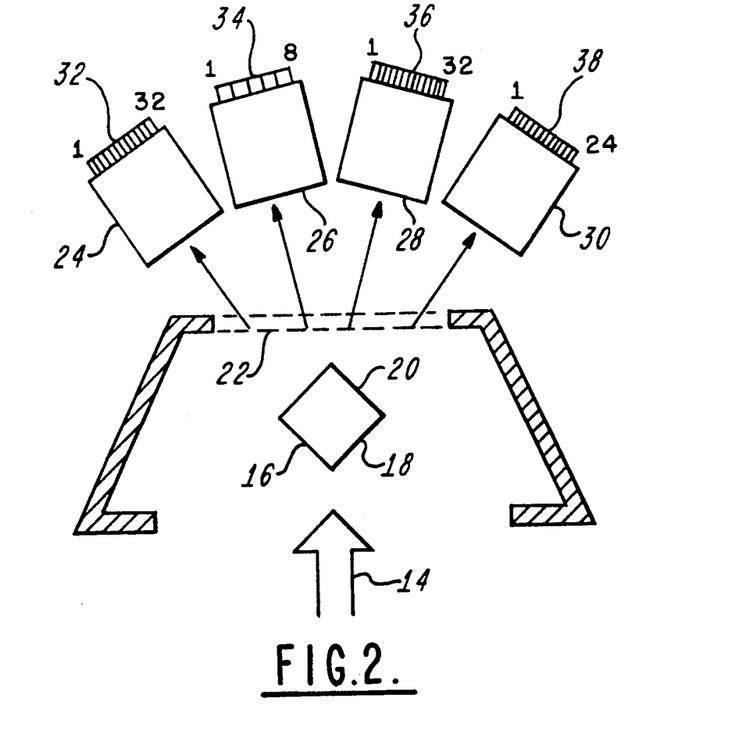
FIG. 2 is a conceptual sectional view through the optical system, useful in understanding the invention.

FIG. 2 is a conceptional sectional view through the optical system. Radiant energy 14 is incident upon the faces 16 and 18 of a mirrored polygon 20. Mirrored polygon 20 is adapted for rotation at a scan rate variable between 5 and 50 revolutions per second. Pairs of folding mirrors (not shown) direct the reflected electromagnetic energy through an aperture 22 (not to scale) where the light is directed through an array of mirrors and splitters to a plurality of spectrometers 24, 26, 28, 30. The operation of the rotating reflecting polygon and folding mirrors is such that the aperture stop is the sum of the two areas projected on faces 16 and 18. Since, in the preferred embodiment, the polygon mirror scans the ground four times with each rotation, it provides an effective scan rate one fourth that of an equivalent single rotating mirror type scanner. This is a very important feature for achieving bandwidth limited noise effective temperature change (NE$\Delta$T). The slower the scan rate, the lower NE$\Delta$T can be achieved, resulting in greater detection effectiveness. Each spectrometer is equipped with a bandpass filter and a plurality of detector elements 32, 34, 36, and 38 which may range from one to 128 to provide up to 128 corresponding channels and with a variable bandwidth optimized to provide the highest practical signal-to-noise ratio for the desired wavelength. The modular system design allows for the system to be easily adapted to a specific application from the broadest needs of the full spectrum (0.35 um to 20 um) to specific thermal, infrared, visible, or ultraviolet wavelengths. In one representative embodiment, spectrometer 24 was designed for response in the visible and near infrared wavelength range, and provided a 32 element detector array utilizing a bandwidth 20 nm for each of 32 channels. A near infrared spectrometer 26 provided an array of 8 detectors of 50 nm bandwidth and covers the wavelength range of 1.4-1.8 um. Spectrometer 36 is adapted for the infrared region from 2.0-2.5 um and utilizes 32 detectors each having a nominal bandwidth of 15 nm. Spectrometer 30 is adapted for the far infrared region and may be provided with a 24 element detector array, covering 8-12 um, each channel occupying a bandwidth of 0.2 um. The technology also permits providing an array in the 3-5 um wavelength, with channels of the order of 0.4 um. It may be seen that the bandwidth of each spectrometer and each detector element in the detector array maybe particularly adapted to provide optimum performance in the desired frequency spectrum by selecting a channel wavelength and bandwidth which is most likely to resolve the desired features, such as, for example, the spectrum signature of particular forms of mineral deposits. A spectrometer apparatus particularly adapted for thermal scanning in shown in FIG. 4 and will be discussed below.

Figure 3:
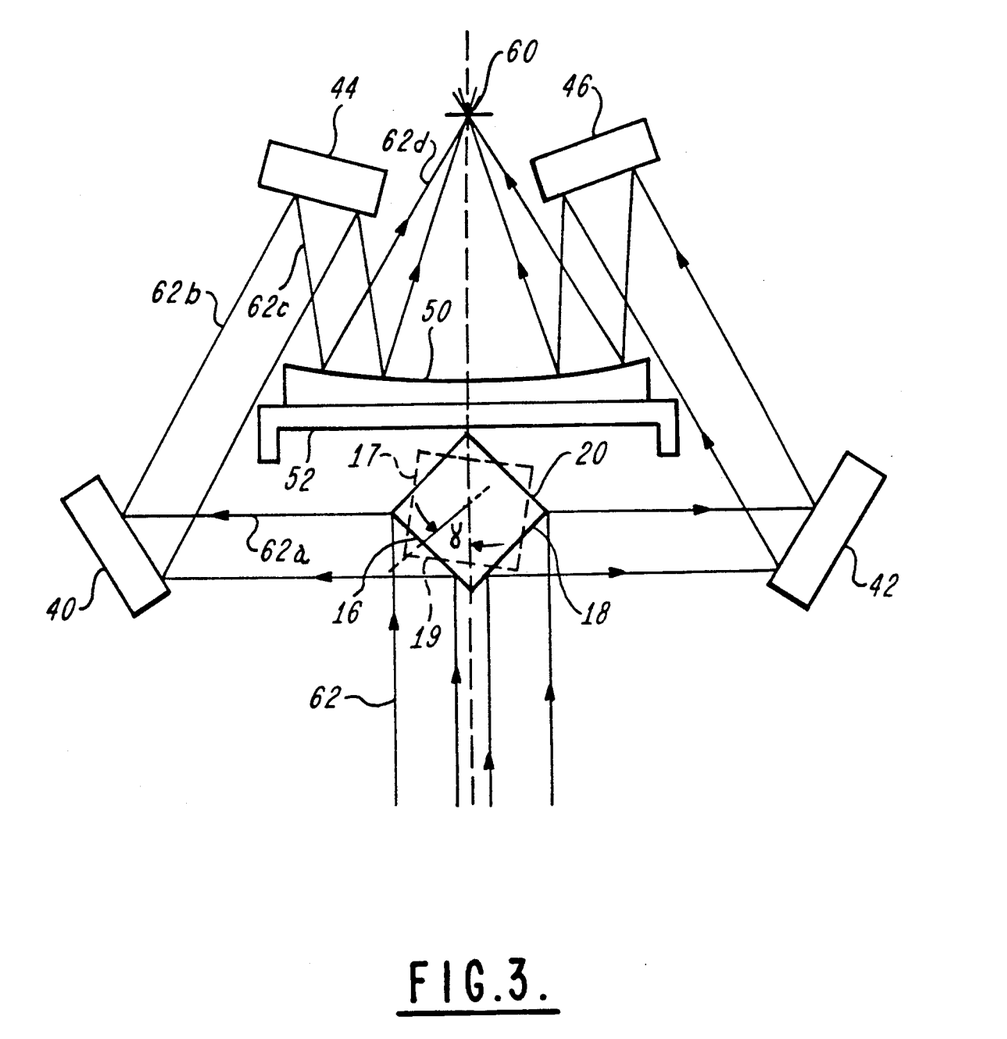
FIG. 3 is a sectional view through the scanning optics of the present invention.

Referring now to FIG. 3, the split-field scanning system utilizing a rotating reflecting polygon is shown in detail. The system is equipped with a plurality of folding mirrors 40, 42, 44, and 46. In the initial position of polygon 20, shown by the solid lines, a light ray 62 is reflected from surface 16 to folding mirror 40, which is angularly disposed at approximately 60 degrees. Light ray 62a is reflected from mirror 40 as ray 62b. Ray 62b in turn is reflected from mirror 44, which is preferably at an angle of 15 degrees with respect to the horizontal, to produce reflected ray 62c. Reflected ray 62c impinges upon the concave surface of concave reflector 50 and the resultant ray 62d appears at aperture 60. In a similar manner, light rays impinging on surface 18 of reflecting polygon 20 are directed by folding mirrors 42 and 46 to concave mirror 50 and then to the aperture 60. The aperture stop area is the sum of the two projected areas, which has a value of $\sqrt{2}A$ at the position shown, where A is the area of a face of the polygon. As the mirror rotates through an angle $\gamma$ as shown by the dotted line, mirror face 16 rotates to position 17 and mirror face 18 rotates to position 19. As the mirror rotates to the angle $\gamma$ from one position to the other, one side has a projected area of A cos $\gamma$ and the second side has a projected area of A sin $\gamma$. Thus, the total area is A(cos $\gamma$ + sin $\gamma$). Mirrors 40 and 42 must be positioned such that they provide a reflecting surface from the axis of the polygon to the entrance aperture. Thus, when polygon 20 rotates 30 degrees from the vertical position, rays 60 degrees from the vertical will enter the system. In this manner, the rotating polygon provides substantially continuous coverage over a 90-degree scan angle. Since each side of the polygon is used for $\frac{1}{4}$ of the rotation, if there is no vignetting by the mirrors, the scan efficiency will be close to 100%. As heretofore observed, the use of a four-sided mirror allows the scan rate to be reduced by a factor of four which in turn permits a reduced system bandwidth and enhances the signal-to-noise ratio.

Figure 4:
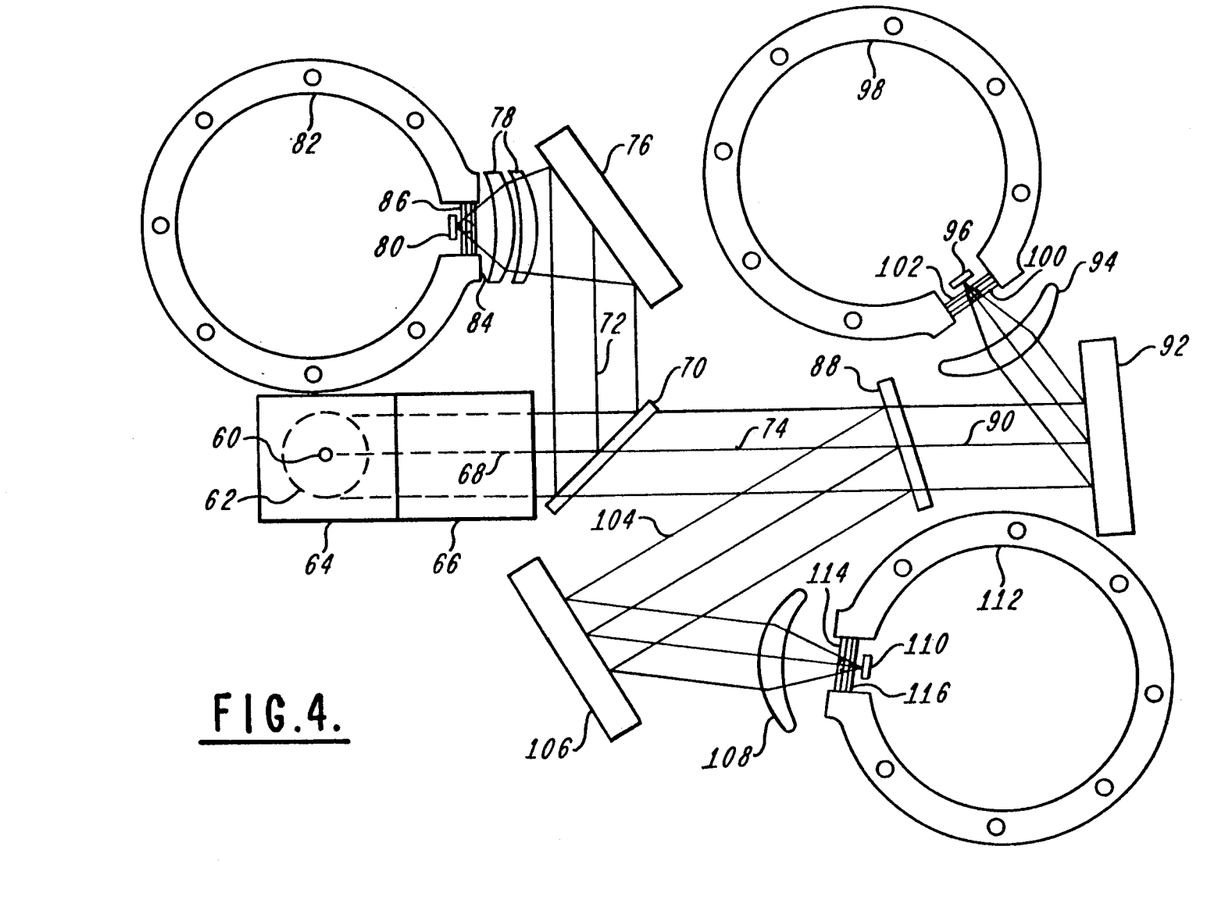
FIG. 4 is a schematic diagram illustrating a cross-sectional planar view of an exemplary spectrometer in accordance with the present invention.

A spectrometer configuration which has been optimized for the thermal spectrum, but which is typical of the application for other wavelengths, is shown in FIG. 4.

Reflected and transmitted radiation from the terrain is received by the imaging optics and focused upon the aperture 60, which as heretofore described, is adjustable for a pre-selected instantaneous field of view. The optical image is directed to collimating lens 62 for providing a collimated output thereof. The collimated output is applied to a mirror 64, which is inclined so as to transmit reflected energy to a first splitter 66. Splitter 66, which maybe a conventional dichroic mirror, is adapted for providing at least first and second bands such that they provide a reflecting surface from the axis of the polygon to the entrance aperture. Thus, when polygon 20 rotates 30 degrees from the vertical position, rays 60 degrees from the vertical will enter the system. In this manner, the rotating polygon provides substantially continuous coverage over a 90-degree scan angle. Since each side of the polygon is used for ¼ of the rotation, if there is no vignetting by the mirrors, the scan efficiency will be close to 100%. As heretofore observed, the use of a four-sided mirror allows the scan rate to be reduced by a factor of four which in turn permits a reduced system bandwidth and enhances the signal-to-noise ratio.

A spectrometer configuration which has been optimized for the thermal spectrum, but which is typical of the application for other wavelengths, is shown in FIG. 4.

Reflected and transmitted radiation from the terrain is received by the imaging optics and focused upon the aperture 60, which as heretofore described, is adjustable for a pre-selected instantaneous field of view. The optical image is directed to collimating lens 62 for providing a collimated output thereof. Aperture 60 is positioned outside the focal length of collimating lens 62. This has the effect of slightly decollimating the centrally diverted incident rays, but encompasses and collimates the normally aberrated edge rays so as to collect the maximum optical flux. The collimated output is applied to a mirror 64, which is inclined so as to transmit reflected energy to a first splitter 66. Splitter 66, which maybe a conventional dichroic mirror, is adapted for providing at least first and second bands of spectral emissions having different predetermined wavelengths. The individual channel wavelengths may be adapted for contiguous or noncontiguous coverage, in accordance with the survey objectives. For clarity, only one of said first and second bands is shown in FIG. 4, that being the thermal wavelength range, it being understood that a second wavelength band maybe directed to a further spectrometer (not shown) for analysis in other wavelengths as in the visual range. Accordingly, the transmitted rays 68, which are representative of the thermal emission spectra, impinge upon a second splitter 70. While splitter 66 is adapted for dividing the collimated output into the visible wavelengths and the infrared wavelengths, splitter 70 is designed to provide a first subband 3-5 um, as denoted by rays 72 and second and third subbands 8-10 um and 10-12 um denoted by rays 74. It will be clear to one skilled in the art that these values are merely exemplary and not limiting. Considering first rays 72, splitter 70 is oriented as so to direct these rays upon a diffraction grating 76 which is constructed with a suitable blaze angle and angle of incidence for disbursing the incident spectral emissions over a predetermined angular dispersion at different predetermined wavelengths. A focusing lens 78 operative at high efficiency in the 3-5 um wavelength range focuses the diffracted rays upon a line detector array 80. Line detector array 80 may be comprised of at least three individual sensing elements, each responsive over a 1 um bandpass. Detector array 80 is housed within a Dewar container 82 and cooled by liquid nitrogen so as to maintain detector array 80 at a predetermined low temperature, essential for low-noise operation. A bandpass filter 86, to be described with respect to FIG. 6, assures adequate skirt selectivity and attenuates any undesired out of band transmittance by grating 76.

Facing beam 74 of splitter 70 is a further splitter 88 which transmits a portion 90 of the incident rays, preferably in the suband region 10-12 um, to a second diffraction grating 92. Diffraction grating 92 is designed so as to disperse the incident rays upon a focal lens 94 and produce an image which is focused upon a second detector array 96. Detector array 96 is preferably a 12-element linear array whose sensing elements are individually responsive over the band of 10-12 um. Note that the individual bandwidths are narrower that those of detector array 80 in order to optimize the signal-to-noise ratio. A Dewar 98, window 100, and filter 102 are further provided. Filter 102 is adapted for attenuating frequencies outside the desired band of 10-12 um.

Splitter 88 further directs a third subband of spectral emissions over the wavelength 8-10 um denoted by rays 104 to a third diffraction grating 106. Grating 106 disburses the incident rays which are focused by a lens 108 upon a third detector array 110. Diffraction grating 106 is adapted for operation in the 8-10 um wavelength band. Detector array 110 is enclosed within Dewar 112 which is supplied with an optical window 114 and further equipped with a filter 116 for excluding frequencies outside the bandwidth of 8-10 um. Linear detector array 110 is preferably a 12-element array.

Because of the wide frequency range covered, and the necessity for maintaining the noise threshold at extremely low values, while attaining high optical efficiency, careful choice of the optical materials and an integration of the respective components is essential. Thus, the lens design criteria must consider an appropriate spot size for the detector size, the best dispersion, appropriate energy density transfer from grating to detector, transmission bandpass, and must deal with aberrations to enhance system performance. Because of the designed bandpass requirements, the collimating lens 62 must cover a bandpass of 0.6-12 mm and is preferably comprised of zinc selenide and coated to provide optimal optical characteristics. Such lenses are commercially available from optical specialty houses. Similarly, lens 78 is preferably comprised of zinc selenide for use in the 3-5 um wavelengths. Lenses 94 and 108 may be comprised of germanium. The visual range spectrometer (not shown) may utilize conventional optical grade glass or quartz. Splitter 66 is designed to reflect the visible light wavelengths and transmit the infrared, in a conventional manner. It should be noted that the number and bandwidth of the dispersed spectral emissions has been selected to maximize the detection threshold for a given noise equivalent temperature difference. This is discussed below with respect to FIG. 5.

The sensing elements of the detectors are incrementally spaced in proportion to a given wavelength to which each of the elements is responsive so as to provide a signal representative of a given spectral emission amplitude as a function of wavelength. The diffraction gratings and corresponding detectors are aligned in cooperation to maintain registration of the angularly disposed spectral emissions with predetermined ones of the plurality of sensing elements. Note that the angle of incidence of the gratings defines the angle of dispersion and width of the dispersion field. It must be optimized to provide registration of the disbursed emissions with the spacing of the detector sensors. Note also that each linear detector array is graduated so that the detectors with a fewer number of elements have a smaller cold shield, as described below. The optical elements are further provided with appropriate coatings to maximize transmission over the designed bandpass. The diffraction gratings, in particular, are gold coated. Detectors in the visible range with wavelengths less than 3 um maybe comprised of silicon. In the range of 3–5 um either lead sulfide (Pb S) or, preferably, indium antimonide (In Sb) may be used. A detector comprised of mercury-cadmium-telluride (Hg Cd Te) is preferred for the 8–12 um wavelengths. Note that the filters are placed directly on top of the detectors and serve to enhance the band separation provided by the optical splitters, but are not utilized to define a specific frequency channel. A cold plate (not shown) is placed on top of the filters. Cold plates are masks provided to restrict the field of view of the corresponding sensing element in a cooled detector to cut down on extraneous background photons and thus reduce noise. Narrowing the effective field of view of the detectors improves responsivity.

Figure 5:
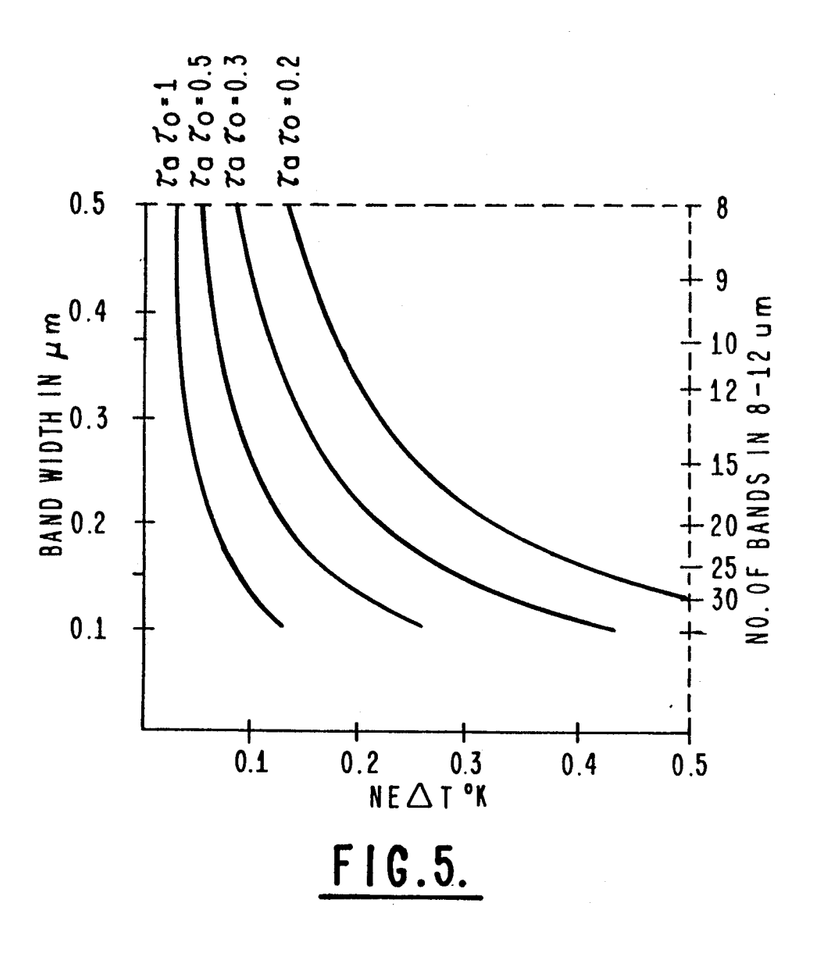
FIG. 5 is a graph presenting bandwidth optimization data as a function of atmospheric transmissibility and noise-equivalent temperature change (NE$\Delta$T).

Referring now to FIG. 5, there is shown a family of curves for determining the optimum channel bandwidth and number of bands as a function of transmission loss and noise equivalent temperature change, which latter factor in turn is a function of the electronic bandwidth and hence of the scan rate of the rotating mirror. Referring to FIG. 5, the lefthand ordinate is scaled in units of optical bandwidth; the righthand ordinate is scaled in terms of the number of bands in the 8–12 um frequency range; the abscissa is scaled in terms of noise equivalent temperature change in degrees Kelvin; and the product of optical and atmospheric transmission is a variable parameter. With an electronic bandwidth of 50 Khz, the spectrometer will have a grating and lens system which has been computed to provide $\tau_a\tau_o=0.2$ as a lower limit. This will put the NEΔT at 0.33 degrees k with 15 bands. If the scan speed is limited to 10 scan/sec, a bandwidth of 20 Khz will permit achieving a noise equivalent temperature change of 0.2° K. with 15 bands. This will provide a signal-to-noise ratio of about 250. An airborne thermal scanner based on the present design concepts, with 6 channels in the 8–12 um region, each with a 0.5 um bandwidth, has been demonstrated to provide a signal-to-noise ratio of approximately 500 at 0.1° K. in NEΔT. This was obtained with the following technical specifications:
 (1) Detector size Ad=0.037 inch×0.037 inch=0.094 cm×0.094 cm.
 (2) Effective optical collecting surface A=139 cm$^2$.
 (3) Bandwidth: B=50 Khz.
 (4) IFOV: =6 mrad.
 (5) Detector: $D^* = 5 \times 10^{10}$ cmW$^{-1}$ Hz$^{\frac{1}{2}}$.
 (6) $\tau_a$: Atmospheric transmittance.
 (7) $\tau_o$: Optical transmittance.

Figure 6:
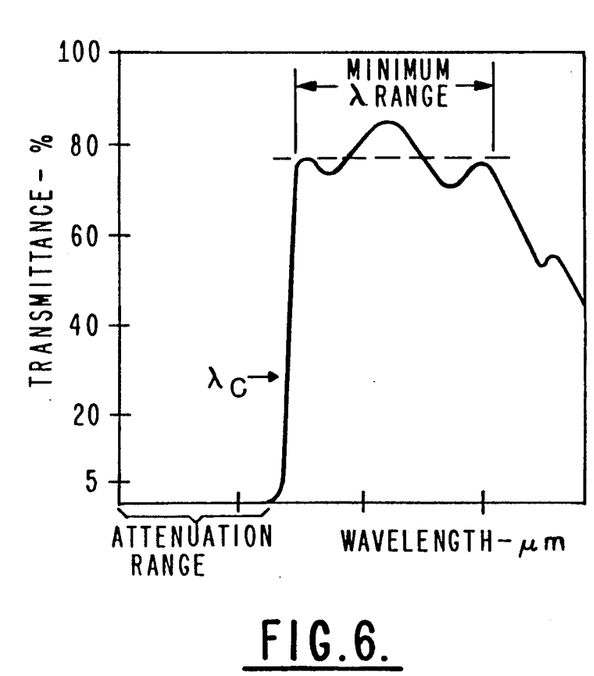
FIG. 6 is a graph presenting bandpass transmittance data for an optical filter which is useful for filtering spectral emissions.

FIG. 6 shows a typical transmittance curve of long-wave bandpass filters. Such filters transmit energy at longer wavelengths than $\lambda_c$, the cuton frequency. Energy below the cuton is rejected. The cuton wavelength denotes the 5% transmittance point. The dashed line denotes the average percent transmittance within the pass band and typically ranges from 70 to 95 percent.

Figure 7:
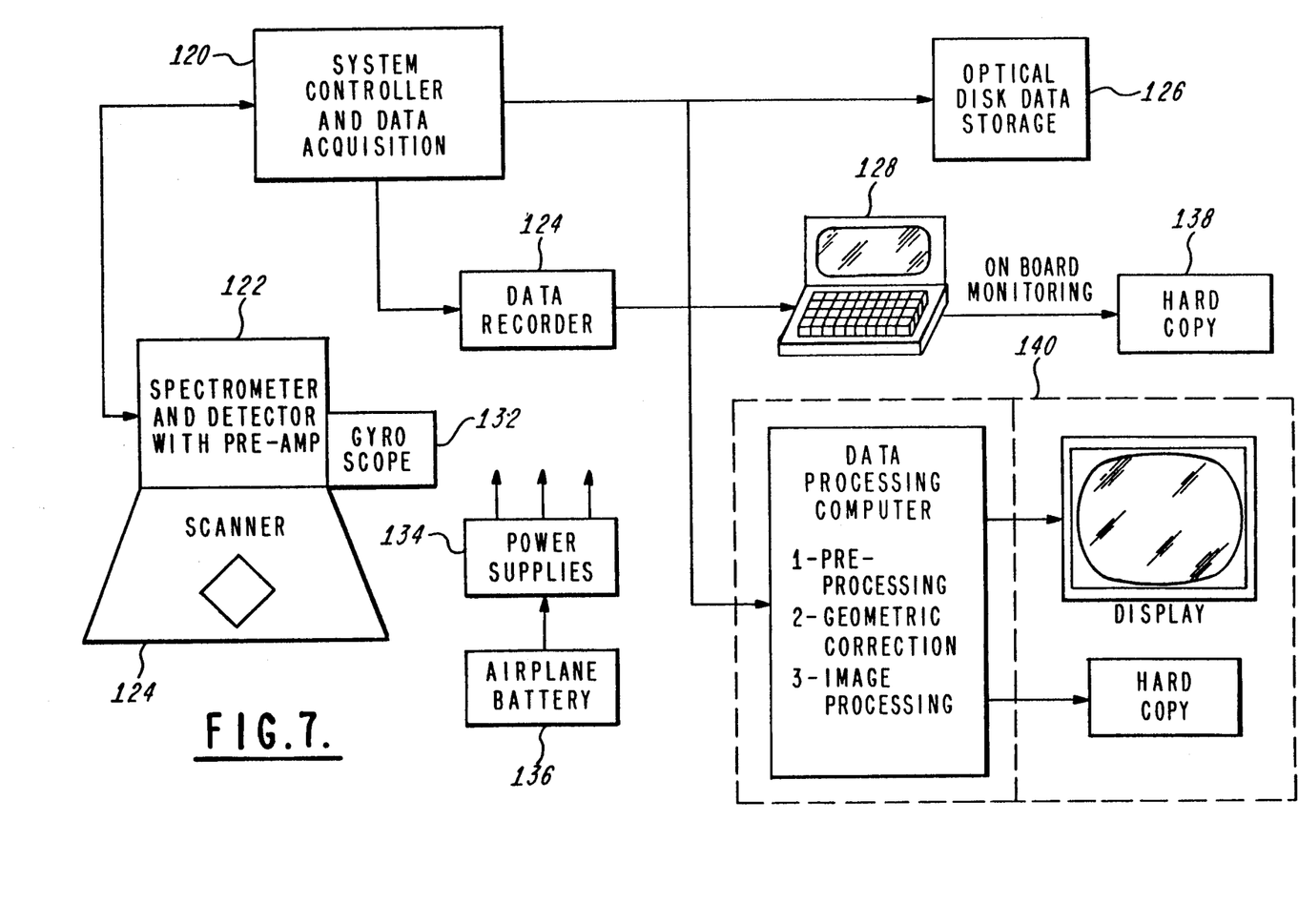
FIG. 7 is a schematic block diagram illustrating a multispectral imaging and display system of the present invention.

FIG. 7 shows the imaging spectrometer and placement of the major subsystems including the optical scanner, spectrometer, detector and preamplifiers, system controller and data acquisition, disk data storage, onboard monitoring, and ground data processing computer. The apparatus is operated under the control of the system controller and data acquisition unit 120 which interfaces with the spectrometer and detector 122, scanner 124, gyroscope 132, data recorder 124, storage unit 126, onboard monitoring display 128, hardcopy recorder 130 and, optionally, ground data processing computer 140.

Viewing of the scene is done with the scanner 124 operating at the rate of 5 to 50 scans/sec. Up to 720 data channels from a plurality of spectrometers are read simultaneously from the scanner. Each detector has a separate amplifier and A/D converter, to provide all parallel data acquisition channels, as will be described. The system controller and data acquisition module 120 accepts data in analog form from the detector arrays 122, converts them to a 16-bit digital format and records it on a data recorder 124, which maybe a tape unit or optical disk data storage 126. The controller 120 also supplies the scan motor and gyroscope with proper operating and synchronization signals. The onboard monitor 128 provides a real time display of up to three onboard bands per monitor window. Preferably, the data will be in industry standard format. Since all detectors operate in parallel, without multiplexing, and all channels are acquired simultaneously, there results perfect band-to-band registration and continuous spectral curves for each pixel. Any conventional recorder with suitable frequency response and recording time capability will be suitable. A typical 2400 ft digital tape can record up to 2000 scan lines for the 64 channel embodiment with the total amount of data in one tape exceeding 130 Mbyte. An erasable optical disk storage unit 126 is also suitable. Computer 128 maybe an IBM (R) compatible machine or workstation, utilizing a state of the art commercial microprocessor to provide adequate processing speed and capacity. A disc drive of 1.2 Gbyte storage capacity for processing the imaging spectrometer data is suitable. The data are written by the scanner 124 on the digital tape in a packed format. The computer 128 reads the data, decodes the format and than creates a disk file. The zero level is recorded at the end of each scan. For each scan line on tape 32 pixels of zero level data will be recorded. These zero level data are averaged and then subtracted from the image data and the results written to disk as one file for each channel. Gyroscope 132 provides aircraft roll information pixel-by-pixel, which is recorded on an available channel.

For radiometric correction, the scanner maybe set up in a laboratory and calibrated with a standard lamp. This provides a radiance correction factor for each channel. A radiance spectral curve for each pixel can than be produced by applying these factors to the raw data.

Optional computer 140 is used for ground data processing. Geometric correction, data compression, data conversion and any other needed data processing procedures can readily be applied and visually displayed or recorded for future interpretation.

Figure 8:
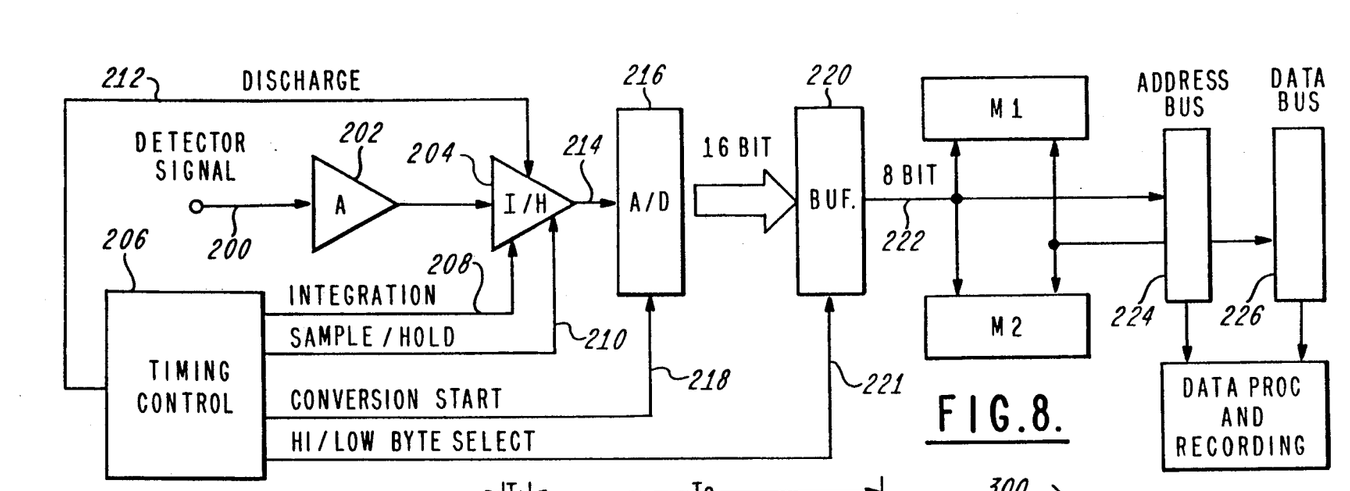
FIG. 8 is a schematic block diagram illustrating processing of a detected optical signal.

Referring now to FIG. 8, an exemplary electronics unit suitable for data acquisition with the subject invention is illustrated. Signal 200 from a detector is applied to amplifier channels 202, and integrated and applied to integrator and sample and hold circuit 204. Integrator and sample and hold unit 204 receives control signals from timing control 206 on leads 208 and 210. A further control signal for discharging the sample and hold circuit is applied on lead 212. Circuit 204 is coupled on lead 214 to A/D converter 216. The conversion process is initiated by a control signal from timing control unit 206 on lead 218. The output of A/D converter 216 is a 16-bit data train which is applied to a buffer 220. Buffer 220 in a manner to be described provides an 8-bit parallel output on lead 222 to ping-pong memories M1 and M2. The outputs of the ping-pong memories are applied to address bus 224 and data bus 226 for subsequent recording and processing.

Figure 9:
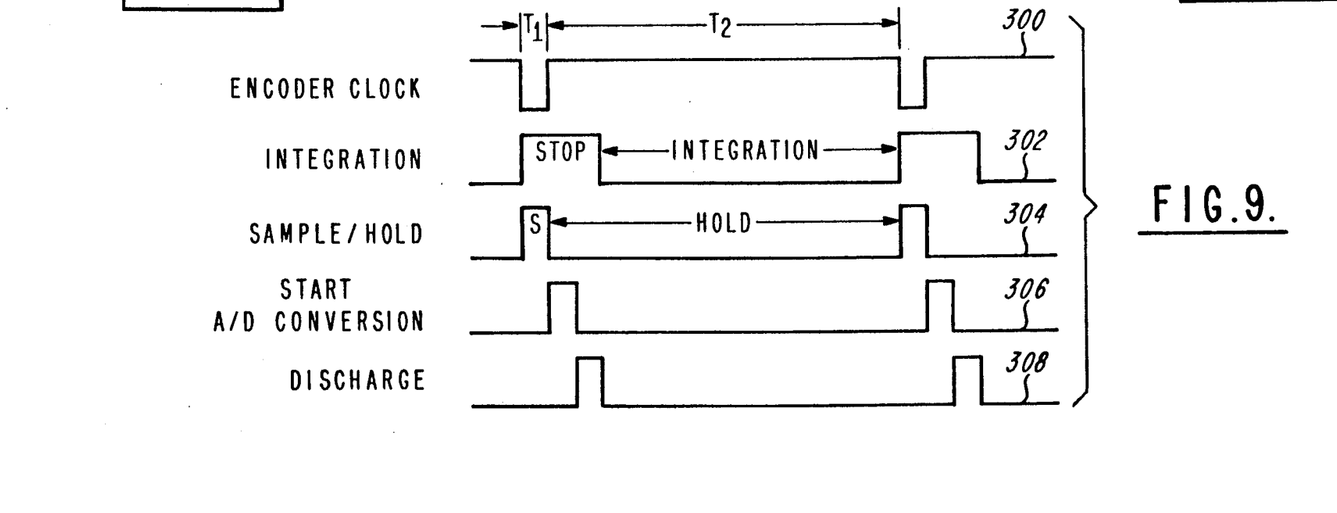
FIG. 9 is a timing diagram useful in understanding the operation of the system of FIG. 8.

The operation of the circuit of FIG. 8 can be understood by referring to the timing diagram of FIG. 9. Timing control 206 provides an encoder clock signal which has an active low period $T_1$ of approximately 1.0 us and a quiescent period $T_2$ which varies with the number of pixels in a scan interval and the mirror rotational speed. Typically, with 512 pixels/scan the sample rate would range from 5 Khz to 50 Khz in accordance with an optical scan rate of 5 to 50 scans/sec. The interval between encoder clock pulses represents the scan time of one pixel. Since the detector output is continually varying during the scan cycle, the integrator embodied in circuit 204 provides a continuous output signal which is incremented with time. The sample rate then will define an average pixel amplitude and a period controlled by timing waveform 304. The sample period than is coincident with the encoder clock frequency. Analog-to-digital conversion is initiated at the completion of the encoder clock pulse and is followed by a discharge signal denoted by waveform 308. It maybe noted from waveform 302 that integration is stopped during the active portion of waveforms 304, 306, and 308 and is initiated on completion of the discharge pulse.

The noise equivalent temperature change of a bandwidth limited system will have a signal-to-noise ratio of at least 250. To accommodate this S/N the digital dynamic range should be at least 5 times or greater this value. Thus, a minimum count of 1250 in digital range is needed to meet this requirement. This corresponds to a 12 bit A/D converter. However, due to the utilization of ac coupling of the analog signal, the required dynamic range is at least twice the data range, and a 16-bit a/d converter is provided to give extra range for the dc restoration adjustment. Preamplifier 202 should preferably have a gain of at least 60 db and provide an output over $+/-15$ volts. A bandwidth of dc$-100$ Khz is require for scans up to the rate of 50 scans/sec. With an appropriately low-noise preamplifier, the system will be noise limited by the detector.

The 16-bit output of converter 216 is applied to a buffer 220. Buffer 220 responds to a control signal on lead 221 from timing control 206. Buffer 220 acts to transmit the 16-bit input as a train of alternating high and low 8-bit data trains. A complete sequence of 8-bit high and low bits is applied to one of the ping-pong memories, say M1, and stored therein over a first complete scan, which may comprise 512 or 1024 pixels, for example. On the next scan, the 16-bit word comprised of alternating high and low 8-bit data trains is written into memory M2 while memory M1 reads out its contents to address bus 224 and data bus 226. In this manner, the ping-pong memories M1 and M2 are alternately written to and read out for data analysis.

The data produced are compared to a library of known values for materials likely to be observed on a pixel-by-pixel basis. Referring again to FIG. 7, the on-board monitor 128 may be used to display data on a scan-by-scan basis or as a two-dimensional map. Through the use of conventional pseudo-color processing, spectral data maybe distinguished for various materials and conditions. Further processing maybe done by the ground data processing computer 140. Geometric correction, data compression, data conversion and any other needed data processing procedures can be applied.

It may be seen that the present invention provides a high resolution radiometric imaging spectrometer suitable for low speed, low altitude aircraft. A complementary design of spectrometer, detectors, and data acquisition bandwidth and number of channels provides a system which is detector noise limited and results in all channels being acquired simultaneously to provide perfect band-to-band registration in a continuous pixel-by-pixel readout. Data outputs are in a form for processing by industry standard recorders and computers.

While the invention has been described in its preferred embodiments, it is to be understood that the words which have been used are words of description rather than limitation and that changes maybe made within the preview of the appended claims without departing from the true scope and spirit of the invention in its broader aspects.

Embodiments of an invention in which an exclusive property or right is claimed is defined as follows:

1. A geological, geophysical, and environmental survey instrument adapted for use with an airborne vehicle, comprising:

optical imaging means, comprising: wide-angle rotating mirror means having a plurality of reflective surfaces for providing a substantially continuous image with respect to time of radiant spectral emissions at a predetermined angular field of view, and first fixed mirror means for redirecting said image of spectral emissions from said rotating mirror means through an aperture to collimating means for providing a collimated output thereof;

spectrometer means, comprising second fixed mirror means angularly disposed for directing said collimated output to first beam splitter means, said first beam splitter means integrally located in the optical path of said collimating means for receiving said output and for providing at least first and second bands of spectral emissions having different predetermined wavelengths to diffraction grating means, said diffraction grating means selectively responsive to a corresponding one of said at least first and second bands of spectral emissions for providing a predetermined angular dispersion of said spectral emissions at said different predetermined wavelengths, the number and bandwidth of said dispersed spectral emissions selected for maximizing a detection threshold for a given noise equivalent temperature difference;

detector means, comprised of a plurality of photoresponsive sensing elements configured in a line array, each of said sensing elements so constructed and adapted for responding to a given bandwidth of spectral emissions and spatially disposed for alignment with one of said angularly dispersed spectral emissions, said sensing elements being incrementally spaced in proportion to a given wavelength to which each of said elements are responsive, for providing a signal representative of a given spectral emission amplitude as a function of wavelength, said diffraction grating means and said detector means cooperating in alignment to maintain registration of said angularly disposed spectral emissions with predetermined ones of said plurality of sensing elements; and signal processing means simultaneously operative for each of said sensing elements, comprising means for averaging and holding a detected signal at a substantially constant value to provide a continuous signal output for a predetermined period of time, means for periodically sampling said continuous signal output in synchronism with rotation of said rotating mirror means and for producing an updated sample corresponding to the interval between successive pixels as said mirror means traverses said angular field of view, and an analog-to-digital converter, thereby to provide a continuous signal output in digital form at each of said sensed spectral wavelengths.

2. A geological, geophysical, and environmental survey instrument as set forth in claim 1, said spectrometer means further comprising:

thermal imaging spectrometer means comprising second beam splitter means angularly disposed in the optical path of said first beam splitter means, for dividing said first band of spectral emissions into third and fourth bands of spectral emissions at different predetermined wavelengths;

said diffraction grating means comprised of first, second and third diffraction grating means operative at respective first, second and third subbands responsive to infrared spectra; said first grating means disposed at a predetermined angle of incidence with respect to the horizontal plane such that spectrally dispersed emissions of said first subband are directed at first focusing lens means for focusing said spectrally dispersed emissions from said first grating means to be incident upon at least three corresponding sensing elements of said detector means, said three elements responsive to predetermined bandwidths, said first subband comprising wavelengths between 3 to 5 um;

further comprising third beam splitter means angularly disposed with respect to the horizontal plane to respond to said fourth band of spectral emissions and to direct at least a first portion thereof to said second grating means, said second grating means angularly disposed with respect to the horizontal plane such that spectrally dispersed emissions of said second subband are directed at second focusing lens means for focusing said portion to be incident upon at least 12 corresponding sensing elements of said detector means, said twelve elements responsive to predetermined bandwidths, said second subband comprising wavelengths between 10 to 12 um;

said third diffraction grating means angularly disposed with respect to said third beam splitter means to respond to a portion other than said first portion of said fourth band of spectral emissions and to direct said other portion to third focusing lens means for focusing emissions of said third subband to be incident upon at least a further 12 corresponding sensing elements of said detector means, said third subband comprising wavelengths between 8-10 um; and housing means enclosing each of said sensing elements and containing cooling means for passively cooling each of said sensing elements responsive to said first, second, and third wavelength subbands;

said second band of spectral emissions directed by said first beam splitter means to a fourth focusing means for focusing emissions incident thereupon to be incident upon at least one sensing element of said detector means responsive over a bandwidth of 0.4 to 1.0 um.

3. Spectrometer means as set forth in claim 2, said first lens means being comprised of zinc selenide and having an optical bandwidth of at least 3-5 um; said second lens means being comprised of germanium and having an optical bandwidth of at least 10-12 um; and said third lens means being comprised of germanium and having an optical bandwidth of at least 8-10 um.

4. Spectrometer means as set forth in claim 3, said sensing elements responsive to the 3-5 um wavelength subband being comprised of indium antimonide; said sensing elements responsive to the 8-10 um wavelength subband and the 10-12 um subband being comprised of mercury cadmium telluride; and said sensing elements responsive to the second band of spectral emissions being comprised of silicon.

5. Spectrometer means as set forth in claim 4, further comprising bandpass filter means, a plurality of said sensing elements defining a given optical bandwidth being exposed through said bandpass filter means, the bandwidth of said filter means being selected to complement the response of said sensing elements and further define at least one of said infrared subbands within predetermined limits by permitting passage of spectral emissions within said given bandwidth and substantially opposing passage of spectral emissions outside said given bandwidth.

6. Spectrometer means as set forth in claim 5, wherein at least one of said sensing elements comprises a photoresponsive detector.

7. Spectrometer means as set forth in claim 6, wherein at least one of said sensing elements comprises a photovoltaic detector.

8. Spectrometer means as set forth in claims 6, wherein at least one of said sensing elements comprises a photoconductive detector.

9. Spectrometer means as set forth in claim 6, further comprising cold shield means for restricting the field of view of said sensing elements defining a given optical bandwidth.

10. A collimating lens as set forth in claim 1, wherein said lens is comprised of zinc selenide and optically coated to provide at least a bandwidth of 0.6-12 um.

11. Spectrometer means as set forth in claim 1, wherein at least one of said first and second bands of spectral emissions are contiguously disposed.

12. Spectrometer means as set forth in claim 1, wherein at least one of said first and second bands of spectral emissions are not contiguously disposed.

13. A geophysical, geological, and environmental survey instrument as set forth in claim 1, further comprising recording means responsive to said signal in digital form for each of said sensed spectral wavelengths, for recording data represented by a plurality of signals from said detector means.

14. A geophysical, geophysical, and environmental survey instrument as set forth in claim 13, further comprising video monitor means responsive to said signal in digital form at each of said sensed spectral frequencies, for selectively providing a pixel-by-pixel display of at least one of said signals as a function of amplitude of said spectral emissions and their wavelength.

15. A geophysical, geophysical, and environmental survey instrument as set forth in claim 14, further including timing control means for producing a control signal corresponding to the duration said detector means is exposed to spectral emissions from a given pixel, synchronized with said rotating mirror means, for controlling said means for holding a detected signal, said means for periodically sampling, and said analog-to-digital converter; said timing control means further including a byte select control signal for providing a further control signal corresponding to the duration of a scan interval.

16. A geophysical, geological, and environmental survey instrument as set forth in claim 15, wherein said analog-to-digital converter means is adapted to provide a 16-bit digital output signal and comprising buffer means responsive to said 16-bit digital signal for converting said 16-bit signal into two sequential 8-bit bytes in response to said byte select control signal;

said signal processing means further comprising first and second random access memory means alternately and sequentially responsive to said sequential 8-bit bytes for writing a sequence of 8-bit high and 8-bit low digital signals into a first one of said memory means while reading into data processing means and recording means from said second one of said memory means a previously stored sequence of sequential 8-bit bytes.

17. A geological, geophysical, and environmental survey instrument as set forth in claim 1, wherein said collimating means is disposed with respect to said aperture outside the focal point of said collimating means, whereby aberrated rays from said aperture are further collimated to enhance collection of optical flux, as compared to disposing said aperture at said focal point, while central rays from said aperture are not fully collimated.

* * * * *